US010877149B2

(12) United States Patent
Khlifi

(10) Patent No.: US 10,877,149 B2
(45) Date of Patent: Dec. 29, 2020

(54) METHOD FOR OPERATING A MULTIPLICITY OF RADAR SENSORS IN A MOTOR VEHICLE AND MOTOR VEHICLE

(71) Applicant: AUDI AG, Ingolstadt (DE)

(72) Inventor: Rachid Khlifi, Garching (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/660,674

(22) Filed: Oct. 22, 2019

(65) Prior Publication Data

US 2020/0124720 A1 Apr. 23, 2020

Related U.S. Application Data

(63) Continuation of application No. 15/514,459, filed as application No. PCT/EP2015/001892 on Sep. 24, 2015, now Pat. No. 10,451,729.

(30) Foreign Application Priority Data

Sep. 25, 2014 (DE) ...................... 10 2014 014 307

(51) Int. Cl.
*G01S 13/931* (2020.01)
*G01S 13/86* (2006.01)

(52) U.S. Cl.
CPC ............ *G01S 13/931* (2013.01); *G01S 13/86* (2013.01); *G01S 2013/932* (2020.01); *G01S 2013/93271* (2020.01); *G01S 2013/93272* (2020.01); *G01S 2013/93274* (2020.01)

(58) Field of Classification Search
CPC ...... G01S 13/86; G01S 13/865; G01S 13/867; G01S 13/931
See application file for complete search history.

(56) References Cited

U.S. PATENT DOCUMENTS 5,717,399 A 2/1998 Urabe et al.
5,748,141 A 5/1998 Hoess
(Continued)

FOREIGN PATENT DOCUMENTS

CN 101833092 A 9/2010
CN 104765030 A 7/2015
(Continued)

OTHER PUBLICATIONS

Lee et al., "A Fully-Integrated 77-GHz FMCW Radar Transceiver in 65-nm CMOS Technology," IEEE Journal of Solid-State Circuits 45 (12) :2746-2756, Dec. 2010.
(Continued)

*Primary Examiner* — Peter M Bythrow
(74) *Attorney, Agent, or Firm* — Sterne, Kessler, Goldstein & Fox P.L.L.C.

(57) ABSTRACT

A method for operating a plurality of radar sensors (2, 2a-2h) in a motor vehicle (1, 1'), wherein at least one operational parameter of the radar sensors (2, 2a-2h) can be changed, wherein driving situation data describing a current driving situation of the motor vehicle (1, 1') are analyzed in order to determine a requirements profile for the sensor data of the radar sensors (2, 2a-2h) and wherein the operational parameters of the radar sensors (2, 2a-2h) are adapted to the requirements profile taking into consideration at least the detection properties of all radar sensors (2, 2a-2h).

12 Claims, 3 Drawing Sheets

(56) References Cited

U.S. PATENT DOCUMENTS

Figure 1:
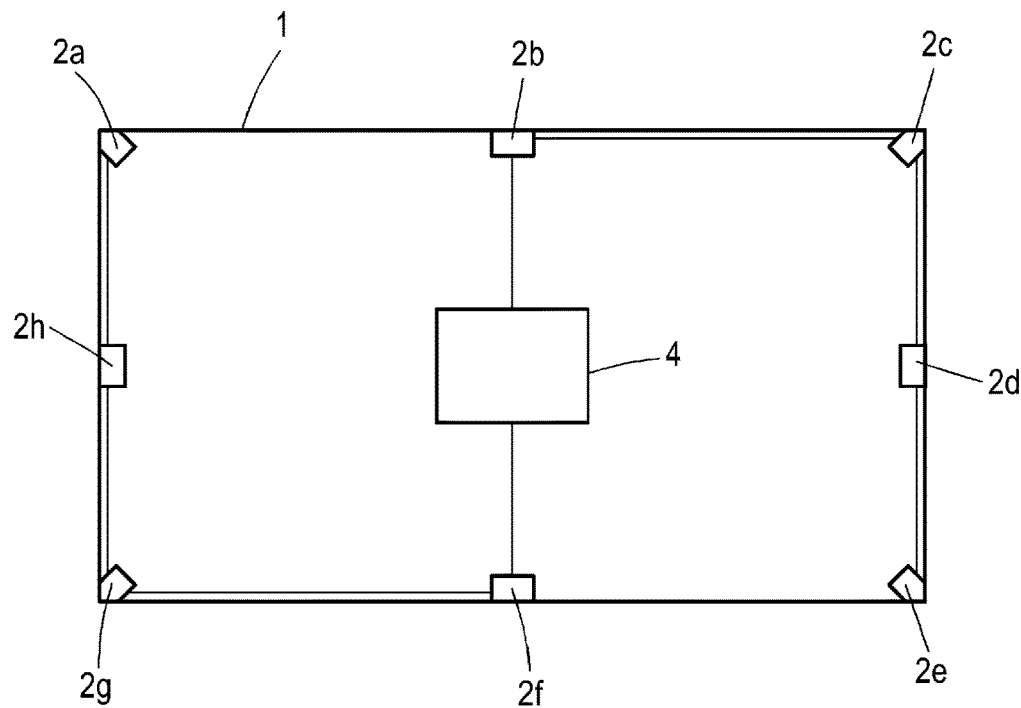

| | | | |
|---|---|---|---|
| 5,847,661 A * | 12/1998 | Ricci | G08G 1/163 340/902 |
| 6,018,307 A | 1/2000 | Wakayama et al. | |
| 6,215,438 B1 | 4/2001 | Oswald et al. | |
| 6,404,381 B1 | 6/2002 | Heide et al. | |
| 6,670,910 B2 | 12/2003 | Delcheccolo et al. | |
| 6,888,491 B2 * | 5/2005 | Richter | G01S 7/023 342/70 |
| 8,212,713 B2 * | 7/2012 | Aiga | G01S 17/42 342/52 |
| 8,957,807 B2 | 2/2015 | Mills et al. | |
| 8,994,581 B1 * | 3/2015 | Brown | G01S 13/931 342/83 |
| 9,389,312 B2 | 7/2016 | Khlifi | |
| 9,720,080 B1 * | 8/2017 | Rodenbeck | G01S 13/58 |
| 10,031,223 B2 | 7/2018 | Watanabe et al. | |
| 10,451,729 B2 | 10/2019 | Khlifi | |
| 2004/0107030 A1 * | 6/2004 | Nishira | B60W 50/14 701/36 |
| 2004/0215373 A1 * | 10/2004 | Won | G08G 1/161 701/1 |
| 2006/0119473 A1 | 6/2006 | Gunderson et al. | |
| 2007/0159380 A1 | 7/2007 | Nagaishi et al. | |
| 2008/0094274 A1 * | 4/2008 | Nakanishi | G01S 13/931 342/91 |
| 2008/0158046 A1 | 7/2008 | Kai | |
| 2008/0218406 A1 * | 9/2008 | Nakanishi | G01S 13/345 342/192 |
| 2009/0046000 A1 * | 2/2009 | Matsuoka | G01S 13/426 342/147 |
| 2009/0254260 A1 * | 10/2009 | Nix | G01S 13/867 701/96 |
| 2010/0039311 A1 * | 2/2010 | Woodington | G01S 13/34 342/70 |
| 2010/0253573 A1 * | 10/2010 | Holzheimer | G01S 7/40 342/176 |
| 2010/0277359 A1 | 11/2010 | Ando | |
| 2011/0181407 A1 * | 7/2011 | Kole | G01S 17/46 340/435 |
| 2011/0196568 A1 | 8/2011 | Nickolaou et al. | |
| 2011/0234448 A1 | 9/2011 | Hayase | |
| 2011/0291875 A1 * | 12/2011 | Szajnowski | G01S 13/34 342/70 |
| 2012/0194377 A1 | 8/2012 | Yukumatsu et al. | |
| 2013/0069818 A1 * | 3/2013 | Shirakawa | G01S 13/347 342/146 |
| 2013/0169468 A1 * | 7/2013 | Johnson | G01S 7/003 342/41 |
| 2014/0111367 A1 * | 4/2014 | Kishigami | G01S 13/103 342/21 |
| 2014/0191895 A1 | 7/2014 | Binzer et al. | |
| 2014/0253364 A1 * | 9/2014 | Lee | G01S 13/931 342/70 |
| 2014/0340254 A1 * | 11/2014 | Hesse | G01S 13/02 342/173 |
| 2015/0204972 A1 * | 7/2015 | Kuehnle | G01S 13/931 342/156 |
| 2015/0210213 A1 * | 7/2015 | Mitsuta | B60Q 5/001 340/435 |
| 2015/0226838 A1 * | 8/2015 | Hayakawa | G01P 15/00 342/70 |
| 2015/0369912 A1 * | 12/2015 | Kishigami | G01S 13/26 342/113 |
| 2016/0003938 A1 * | 1/2016 | Gazit | G01S 13/02 342/81 |
| 2016/0054441 A1 * | 2/2016 | Kuo | G01S 13/931 342/73 |
| 2016/0061935 A1 * | 3/2016 | McCloskey | G01S 13/325 342/82 |
| 2016/0103206 A1 * | 4/2016 | Pavao-Moreira | G01S 13/345 342/104 |
| 2016/0131752 A1 * | 5/2016 | Jansen | G01S 13/343 342/27 |
| 2016/0178732 A1 * | 6/2016 | Oka | G01S 7/40 342/82 |
| 2017/0285165 A1 | 10/2017 | Khlifi | |

FOREIGN PATENT DOCUMENTS

| | | |
|---|---|---|
| DE | 19845568 A1 | 10/1999 |
| DE | 19803660 C2 | 7/2001 |
| DE | 102013101079 A1 | 8/2013 |
| EP | 0758093 A2 | 2/1997 |
| EP | 2439714 A1 | 4/2012 |
| EP | 2693230 A1 | 2/2014 |

OTHER PUBLICATIONS

International Search Report and Written Opinion of the International Searching Authority directed to related International Patent Application No. PCT/EP2015/001892, dated Dec. 7, 2015, with attached English-language translation; 20 pages.

International Preliminary Report on Patentability directed to related Interantional Patent Application No. PCT/EP2015/001892, dated Sep. 8, 2016, with attached English-language translation; 18 pages.

European Examination Report directed to European Application No. 15 770 797.7, dated Oct. 11, 2019; 6 pages.

* cited by examiner

METHOD FOR OPERATING A MULTIPLICITY OF RADAR SENSORS IN A MOTOR VEHICLE AND MOTOR VEHICLE

The invention relates to a method for operating a plurality of radar sensors in a motor vehicle, wherein at least one operational parameter of the radar sensors can be changed, and to a motor vehicle.

The use of radar sensors in motor vehicles is already largely known in the prior art. Nowadays, radar sensors are often used as environmental sensors for a medium to large distance range in order to be able to determine the distance, angle, and relative velocity of other traffic participants or larger objects. Such radar data can be included in environmental models or made available directly to vehicle systems. In the known prior art, longitudinal guidance systems, such as ACC, or even safety systems benefit from radar data.

The radar sensors of the traditional type often have larger dimensions and are rather massive, since the antennae and the electronic components required directly on the antenna, i.e. the radar front-end, are integrated into a housing. In this case, the electronic components mainly constitute the radar transceiver, which includes a frequency control system (usually comprising a phase lock loop—PLL), mixer units, a low noise amplifier (LNA), and the like; often times, however, control modules and digital signal processing components are also implemented close to the antenna in order to, for example, be able to provide already processed sensor data, such as object lists, to a connected bus, such as a CAN bus.

The implementation of radar components on the basis of semiconductors proved to be difficult for a long time, since expensive special semiconductors, in particular GaAs, were required. Smaller radar sensors were proposed, the entire radar front-end of which is implemented on a single chip using SiGe technology, before solutions in CMOS technology also became known. Such solutions are the result of the expansion of the CMOS technology to high-frequency applications, which is also often referred to as RF-CMOS. Such a CMOS radar chip is implemented in an extremely compact design, does not use any expensive special semiconductors and thus offers first and foremost significant advantages in manufacturing compared to other semiconductor technologies. An exemplary implementation of a 77 GHz radar transceiver as a CMOS chip is described in the article by Jri Lee et Al., "A Fully Integrated 77-GHz FMCW Radar Transceiver in 65-nm CMOS Technology," IEEE Journal of Solid State Circuits 45 (2010), pg. 2746-2755.

Since it was additionally suggested to implement the chip and the antenna in a common package, an extremely cost-effective, small radar sensor is possible, which can satisfy installation space requirements significantly better, has a very low signal-to-noise ratio due to the short signal paths and is also suitable for high frequencies and wider, variable frequency bandwidths. For this reason, such compact-design radar sensors can also be used for short-range applications, such as in the range of 30 cm to 10 m.

It has also already been suggested to provide such a CMOS transceiver chip and/or a package with CMOS transceiver chip and antenna on a common circuit board with a digital signal processor (DSP processor) or to integrate the function of the signal processor into the CMOS transceiver chip as well. A similar integration is possible for control functions.

In today's motor vehicles, radar sensors are usually operated as "stand-alone" sensors, i.e. each radar sensor decides on its own at what operational parameters it is to function, and delivers radar data, wherein radar sensors have also already been suggested, in which signal and function algorithms are implemented. In this case, the radar sensors themselves also constitute the control devices and can thus directly control various actuators, for example, and/or provide outputs via a human-machine interface of the motor vehicle, for example. In this context, the monitoring area to be detected is defined by the implemented or addressed function. This means that the radar sensors are hard-coded for a specific function, which can, for example, be assigned to a vehicle system. This limits the use of the radar sensors for additional functions; moreover, the radar sensors are always active, which results in a high energy consumption.

The invention is therefore based on the task of improving the operation of radar sensors in motor vehicles with regard to efficiency and availability for different functions of vehicle systems.

In order to solve this task, the invention provides in a method of the aforementioned type that driving situation data describing a current driving situation of the motor vehicle are analyzed in order to determine a requirements profile for the sensor data of the radar sensors and that the operational parameters of the radar sensors are adapted to the requirements profile taking into consideration at least the detection properties of all radar sensors.

The invention consequently proposes a centralized control of the radar sensors, which determines from driving situation data regarding the current driving situation, which properties the sensor data currently required of the radar sensors should have in order to be processed as beneficially as possible by at least one function of the vehicle systems of the motor vehicle, preferably several functions of the vehicle systems of the motor vehicle. This is defined by a requirements profile for the sensor data. Such a requirements profile can, for example, include from which interesting surrounding areas sensor data are required, how often/quickly these sensor data are required, and in what quality the sensor data are required. After the device executing the method according to the invention knows where the radar sensors are arranged and what properties the radar sensors have, it is possible, in knowledge of the detection properties of the radar sensors, to map this requirements profile onto operational parameters of the radar sensors that satisfy the requirements profile as well as possible. Consequently, the capacity of all radar sensors is taken into consideration in its entirety in order to thus be able to satisfy the requirements profile as precisely as possible and to in the process achieve improvements with regard to energy consumption, bus utilizations, and/or computing resource needs, since it can be decided, for example, which radar sensors are currently not required and which radar sensors are required. If a suitable architecture of the radar sensors themselves is selected or if the radar sensors are even connected to a central unit, many applications, in particular functions of vehicle systems, can benefit from the performance of this configuration optimization. Additional information regarding the driving situation is therefore used in order to determine an operation of the entirety of the radar sensor as efficient as possible, wherein the interaction, addition, and the like of the detection properties of all radar sensors are taken into consideration.

The requirements profile can, for example, be described by requirements parameters, which preferably specify for various surrounding areas of the surroundings of the motor vehicle, with what priority data are required from them (or if data are required at all from them), what the desired accuracy of the sensor data from the surrounding area is, and how quickly and/or with what frequency the data should ideally be obtained. If it arises from the driving situation data, for example, that a turning process is currently taking place, only sensor data from the direction toward which the motor vehicle turns are ultimately relevant, i.e., for example, the radar sensors pointing toward the left in case of a turning-left process. The other radar sensors can, for example, be deactivated. If a potential collision partner that is to be measured more accurately has already been identified, a critical surrounding area can, for example, be defined, which includes the potential collision partner and from which very precise radar data can be obtained very quickly. For this purpose, data acquisition rates or accuracies of other radar sensors can be reduced, for example, in order to nonetheless allow for a quick transport and a quick analysis of these sensor data from the critical surrounding area. Thus, the analysis of the requirements profile as well as ideally additional efficiency criteria result in operating strategies that are excellently coordinated between the radar sensors.

In doing so, radar sensors that comprise a semiconductor chip implementing the radar transceiver, in particular a CMOS chip, can be advantageously used. These new radar sensors described above and implemented in particular with CMOS technology do not only offer the advantage to be able to be implemented with an extremely compact design and thus to be installed in doors, bumpers, and the like, but it is then also possible, in particular if a digital signal processing component and/or a control unit of the radar sensor are also implemented by the semiconductor chip, to provide part of the intelligence in these radar sensors and to in particular allow for a quick and efficient change of the operational parameters in the radar sensor. It is thus, for example, conceivable to implement the radar sensors such that they can be switched between different frequency bandwidths, data acquisition rates, and the like. A particularly compact, highly integrated design results if the semiconductor chip and an antenna arrangement of the radar sensor are implemented as a package. The radar sensor can then, for example, be constituted in an extremely compact design by the package arranged on a circuit board.

Generally speaking, an activation and/or deactivation of a radar sensor can be triggered by the operational parameters and/or a data acquisition rate and/or at least one operational parameter describing the detection area and/or one operational parameter describing the distance separation capability and/or one operational parameter describing the preliminary evaluation to be carried out by the radar sensors can be used as operational parameters. It is thus conceivable on the one hand to temporarily switch a radar sensor on or off by means of an appropriate operational parameter, but it is also possible to use operational parameters that change the current detection properties as operational parameters in general. The detection properties of the radar sensors taken into consideration in the implementation of the requirements profile are thus to be understood such that the basic setting options of the radar sensors and their effects on the current detection properties are included therein. The general detection properties of the radar sensors thus specify with respect to the operational parameters the basic possibilities for adjusting to a specific operating state with certain current detection properties but also include the arrangement of the radar sensor and allow a conclusion in this respect about the detected part of the surroundings of the motor vehicle.

A specific advantageous embodiment of the present invention provides that for an interesting surrounding area described by the requirements profile, only the radar sensors detecting the interesting surrounding area or the radar sensors detecting the interesting surrounding area with more frequent and/or more precise sensor data than the other radar sensors delivering operational parameters are operated. As already described, it is furthermore conceivable that for a critical surrounding area described by the requirements profile, at least two radar sensors are operated for the redundant detection of at least a part of the critical surrounding area in particular as a subarea of the interesting surrounding area. This is to be explained in more detail using some specific examples.

If it is determined, for example, that a right turn is performed, only the radar sensors for the relevant surrounding areas on the right side are activated. The sensors on the left side are not relevant for this driving maneuver, i.e. for the right turn. This means that they can be turned off or operated at a reduced cost so that an efficient utilization of all of the radar sensors, in particular with respect to the bus bandwidth, computing resources, energy/operating current, performance with regard to dynamic/accuracy/redundancy, etc. is realized with such a deliberate turning on and off or reduction of the requirements. If, for examples, objects in an interesting surrounding area are to be separated precisely from one another, it is possible to operate at least one radar sensor with a higher frequency bandwidth, such as 3 GHz, while the remaining radar sensors are operated with a lower bandwidth, such as 100 MHz. It is also possible to operate some radar sensors with a higher cycle time (lower data acquisition rate) and others with a lower cycle time (higher data acquisition rate).

The detection quality can, for example, be increased by reducing ambiguities if several adjacent radar sensors, the detection areas of which overlap in overlapping areas, can detect certain objects redundantly. If the object is included in the sensor data of all of these radar sensors, the sensor data regarding this object can statistically be merged appropriately.

As already mentioned, it is generally particularly advantageous if at least one efficiency criterion minimizing the energy consumption and/or the amount of data to be transported and/or the required computing resources is also taken into consideration in the adjustment of the operational parameters of the radar sensors. This means that the radar system constituted by the radar sensors is operated as economically as possible with respect to the energy consumption, used bus bandwidth, computing resources, and the like, wherein requirements profiles, such as with regard to potential collision effects or other possibly risky driving maneuvers, in principle naturally outweigh these efficiency criteria. Ultimately, the problem analyzed in the operating method according to the invention is thus how the requirements profile can be achieved with otherwise as high an efficiency as possible. In this context, it can, for example, be provided that one of the radar sensors is turned off and/or its detection area is adjusted to minimize redundancy for a non-critical portion of an interesting surrounding area, included in the requirements profile, of redundantly detecting radar sensors. It is therefore also absolutely possible to turn off radar sensors that deliver the same measurements of the identical object, if an increase in detection quality is not desired. In this way, energy and computing resources can be saved and the amount of data in the bus system can be reduced. This of course also applies to radar sensors that are not relevant for the current traffic scenario.

It can be provided particularly advantageously that radar sensors detecting the surroundings of the motor vehicle in a 360° angle range in their detection areas are used. Thus, several radar sensors can be used in the motor vehicle such that a 360° monitoring of the entire surroundings of the motor vehicle is made possible, whereby a more precise mapping of the entire surroundings (statically and dynamically) can also moreover be achieved. By selecting a suitable architecture or connection of the radar sensors to the unit performing the method according to the invention, a radar system can be created overall that can be adjusted in its operating mode dynamically to the current driving situation and the information actually required from functions of the vehicle systems, wherein an efficient operation is also possible. Such an arrangement of radar sensors can, for example, be achieved with eight radar sensors if radar sensors respectively arranged in the corner areas of the motor vehicle and between the corners of the motor vehicle are used. In doing so, the radar sensors provided at the corners of the motor vehicle can, for example, be aligned at a 45° angle to the longitudinal direction of the motor vehicle and the radar sensors arranged between the corners can respectively be aligned orthogonally to the side on which they are arranged.

In order to implement the method according to the invention, different units can be used, which consequently undertake the analysis and the determination of the operational parameters as well as the control of the radar sensors according to the operational parameters. In this respect, a first alternative embodiment of the present invention provides that the analysis of the driving situation and the control of the radar sensors is carried out by a central control device of the motor vehicle, which central control device is in particular assigned to at least two vehicle systems. Such central control devices are, for example, known by the keyword "central driver assistance system" (zentrales Fahrerassistenzsystem, zFAS). The idea is that all functions to be performed by driver assistance systems are implemented in one single control device, which also receives the sensor data of all connected sensors, hence also of the radar sensors. In this context, it is particularly advantageous if the control device also determines and updates an environmental model of the motor vehicle, since the driving situation data then can also include data of the environmental model, which is available in the control device anyway. Furthermore, such a central control device often times receives additional driving situation data describing the current operating state and the driving situation anyway so that the determination of the requirements profile and of the operational parameters can be implemented as an additional function in a particularly easy manner when all required input data are available. In this respect, various connection architectures of the radar sensors with the central control device are conceivable, a separate connection for each radar sensor for example (star architecture) or even the use of rings or chains, along which the radar sensors are connected. In addition to the general driving situation data, it is also possible in such a central control device to ultimately retrieve from the functions directly which sensor data they require from the radar sensors in order to be able to include this in the requirements profile. In the process, different functions can be weighted, by prioritizing, for example.

An alternative second embodiment of the present invention can provide that the analysis of the driving situation and the control of the radar sensors is carried out by a computing unit of at least one of the radar sensors. Since modern radar sensors themselves have a certain intelligence, such as in the case of the described radar sensors implemented with semiconductor technology, which implement a control unit and/or digital signal processing components by means of the semiconductor chip, the function described by the method according to the invention for determining the requirements profile and the operational parameters can thus also be implemented without any difficulty within a radar sensor. The radar sensor, the computing unit of which undertakes this central coordination, ultimately has a master role, while the rest of the radar sensors can be considered slaves. The master radar sensor utilizes appropriate algorithms, which can, for example, be part of a decision module, in order to analyze the driving situation data for the requirements profile and to derive suitable operational parameters therefrom. It is otherwise also conceivable for such a master radar sensor to be functioning as a distribution point for the sensor data of the radar sensors, to thus, for example, initially accept all sensor data of all radar sensors and to pass them on or to even itself implement functions of at least one vehicle system that analyzes the sensor data.

It is particularly advantageous in this context if the radar sensor, the computing unit of which is used, is selected dynamically, in particular in dependence of the driving situation data and/or the operational parameters. Each radar sensor can thus basically be configured as master or slave, even during driving operation, depending, for example, on the current traffic scenario, i.e. the current driving situation. A particularly efficient utilization (distribution of intelligence) of the configuration with several radar sensors is thereby implemented. For the selection of the radar sensor to be currently used as master, data transmission paths from the other radar sensors delivering the most relevant sensor data, and the like can, for example, be taken into consideration.

As already mentioned, the most varied input data describing the driving situation can be used as driving situation data. In this way, it can in particular be provided that ego data describing the operating state of the motor vehicle and/or at least a predictive operating state of the motor vehicle and/or environmental data describing the surroundings of the motor vehicle and/or requirements data describing specific requirements of at least one vehicle system are used as driving situation data. From this information, an overall picture of the driving situation results, from which the requirements profile can be derived as requirements parameters, for example. If requirements data of vehicle systems or even individual functions of vehicle systems are used, a prioritization can be provided within the vehicle systems and/or the functions so that safety-related vehicle systems are prioritized higher, for example, than comfort-related vehicle systems and the like.

In addition to the method, the invention also relates to a motor vehicle with several radar sensors, wherein at least one computing unit of a radar sensor and/or a control device of the motor vehicle is designed to perform the method according to the invention. All statements related to the method according to the invention can be analogously transferred to the motor vehicle according to the invention, with which the aforementioned advantages can likewise be attained. In this respect, the control device is preferably a central control device that implements the functions of several vehicle systems and possibly also determines and keeps current an environmental model of the motor vehicle.

Preferably, the radar sensors can comprise a semiconductor chip implementing the radar transceiver, in particular a CMOS chip. It is particularly advantageous in this context if a digital signal processing component and/or a control unit of the radar sensor are also implemented by the semiconductor chip and/or if the semiconductor chip and an antenna arrangement of the radar sensor are implemented as a package. As already mentioned, such radar sensors can be implemented in an extremely compact design and can be manufactured cost-effectively, in particular by using CMOS technology, and are thus available. In this way, even large numbers of radar sensors can be integrated into various components of the motor vehicle in a manner saving installation space and ideally invisibly from the outside, such as in a vehicle door and/or a bumper. In particular with the integration of digital signal processing components and/or control units in the semiconductor chip, a corresponding intelligence for performing functions, in particular also the method according to the invention, is also provided by the radar sensors so that it can be provided that the digital signal processing component and/or the control unit of the radar sensor are used as computing unit for performing the method according to the invention.

Figure 2:
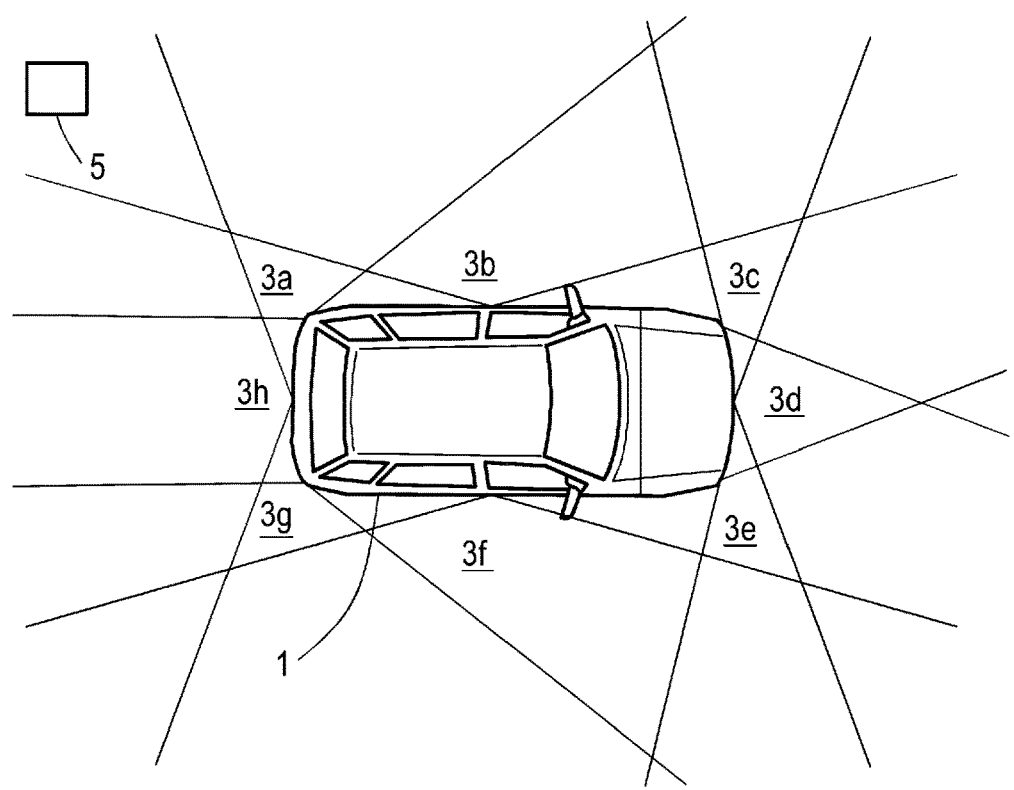
Figure 3:
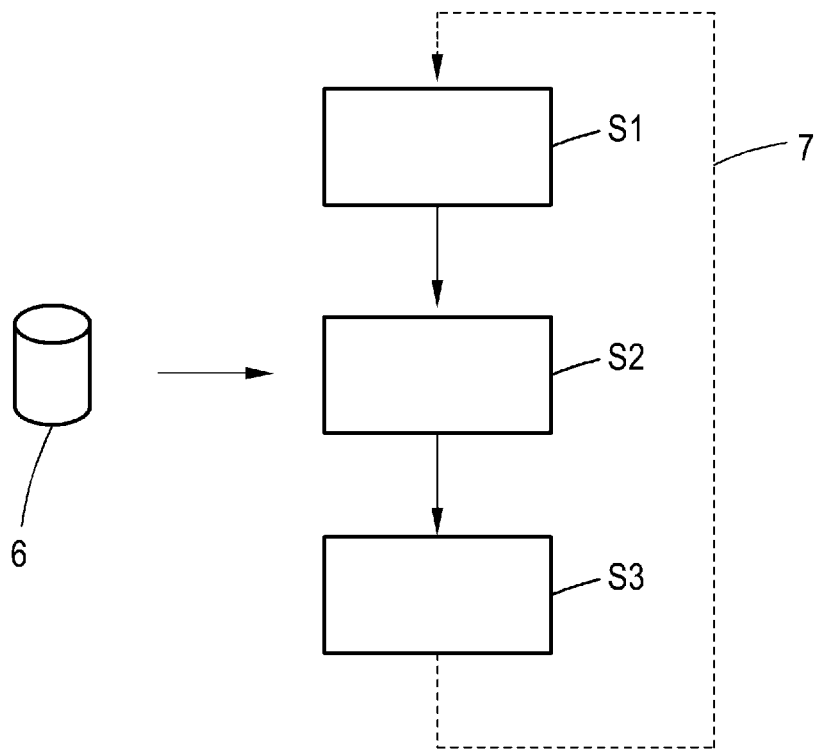
Figure 4:
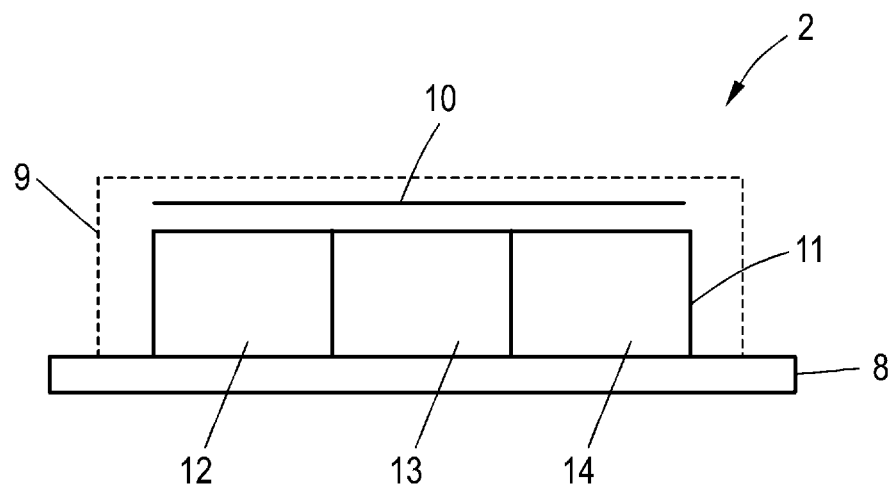
Figure 5:
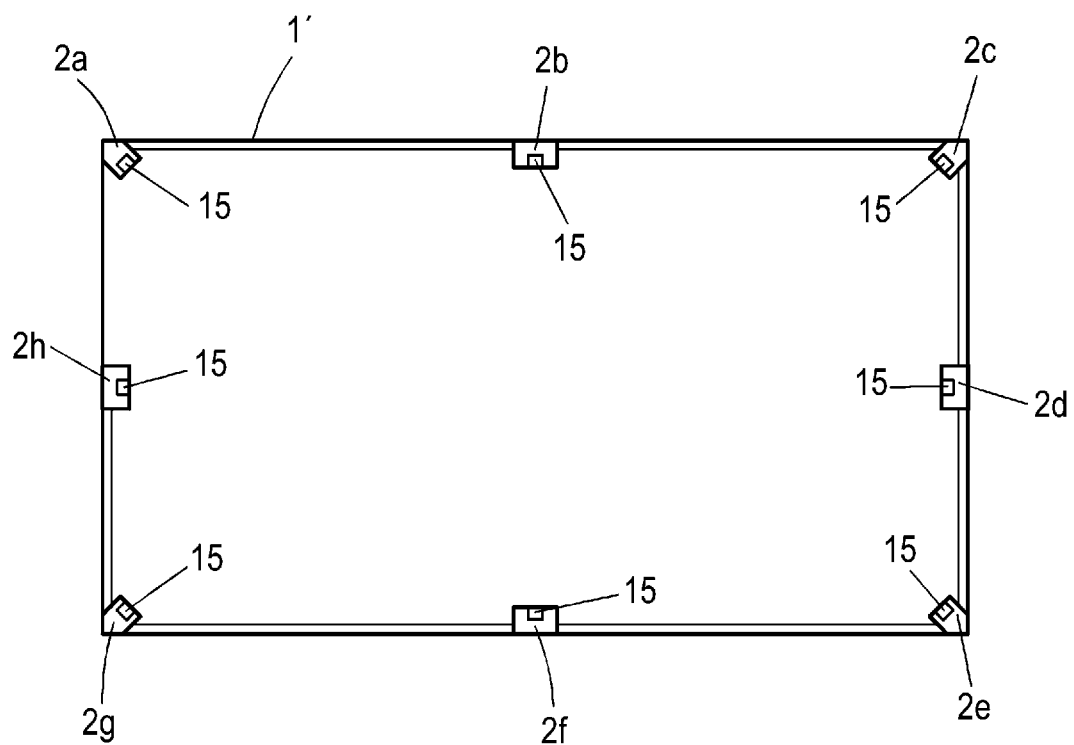

Additional advantages and individual details of the present invention result from the exemplary embodiments described in the following as well as the drawing. The following is shown:

FIG. 1 a motor vehicle according to the invention in a first embodiment,

FIG. 2 the detection areas of the radar sensors of the motor vehicle according to the invention, FIG. 3 a flow chart of the method according to the invention, FIG. 4 a sketch of the design of a radar sensor, and FIG. 5 a motor vehicle according to the invention in a second embodiment.

FIG. 1 shows a schematic diagram of a first embodiment of a motor vehicle 1 according to the invention. In order to allow for a 360° monitoring of the surroundings of the motor vehicle 1, said motor vehicle in this case comprises eight radar sensors $2a$-$2h$, wherein four radar sensors $2a$, $2c$, $2e$, $2g$ are arranged on the corners of the motor vehicle 1, the rest of the radar sensors $2b$, $2d$, $2f$, and $2h$ are respectively arranged on the sides in the center between the corner radar sensors $2a$, $2c$, $2e$, and $2g$. The associated largest possible detection areas of the radar sensors $2a$-$2h$ are illustrated in FIG. 2 and marked with reference symbols $3a$-$3h$. Obviously, a 360° angle range is detected. The radar sensors $2a$, $2c$, $2d$, $2e$, $2g$, and $2h$ can in this case be arranged in the bumpers of the motor vehicle 1, the radar sensors $2b$ and $2f$ in the doors. Different operational parameters of the radar sensors $2a$-$2h$ can be adjusted, in particular the operational parameters defining the current detection properties, such as opening angle, bandwidth, data acquisition rate, and the like.

In order to control the operation of the radar sensors $2a$-$2h$, a central control device 4 is provided, which is designed to perform the method according to the invention. In this case, the radar sensors $2a$-$2h$ are connected to the control device 4 via a chain of four each, wherein other connection architectures are however also conceivable. In this case the central control device 4 performs various functions of several driver assistance systems, in particular of all driver assistance systems, and determines and updates an environmental model of the motor vehicle 1, which is taken into consideration by the various functions, from sensor data of the radar sensors $2a$-$2h$ as well as of additional sensors of the motor vehicle 1, which are not shown in detail here. Furthermore, ego data of the motor vehicle are made available to the central control device 4 via additional vehicle systems not shown in detail here, which ego data can describe the current operating state of the motor vehicle 1 as well as possibly predicated future operating states. It is thus possible within the control device 4 to create a good image of the current driving situation of the motor vehicle 1 by means of the available driving situation data as well as possibly additional data of the functions.

This image is used within the scope of the method according to the invention, the flow chart of said method being illustrated in more detail in FIG. 3.

In the process, a requirements profile for the sensor data of the radar sensors $2a$-$2h$ is determined in a step S1 from current driving situation data describing the driving situation of the motor vehicle 1. In doing so, environmental data describing the surroundings of the motor vehicle, such as the environmental model described, and ego data of the motor vehicle 1, such as its velocity, steer angle, and the like, are, for example, taken into consideration as driving situation data. It is advantageous to additionally also take into consideration requirements data of the functions that use the sensor data of the radar sensors $2a$-$2h$, wherein the functions or the respective vehicle systems can be prioritized with respect to one another.

By processing all of these data, a requirements profile, which can, for example, be described by requirements parameters, results in step S1. Such a requirements profile can initially specify, from which interesting surrounding area of the surroundings of the motor vehicle 1 sensor data are actually to be obtained. Now, this interesting surrounding area can yet be divided into parts, which are assigned, for example, priorities and/or attributes. If a potential collision object was, for example, detected in a critical surrounding area as a subarea of the interesting surrounding are, cf. for example object 5 in FIG. 2, this critical surrounding area can be given a high priority and/or particularly precise sensor data can be requested particularly fast from this area. Other interesting and/or even critical surrounding areas results, for example, from the current driving direction of the motor vehicle 1. If said motor vehicle drives backward, for example, the surrounding area located behind the motor vehicle 1 is the interesting surrounding area; if a turning process to the right is taking place, the surrounding area located to the right of the motor vehicle 1 is the interesting surrounding area, and the like. The conclusion can thus obviously be drawn from the driving situation, from where in what frequency, speed, and quality, sensor data of the radar sensors $2a$-$2h$ are required, which is described by the requirements profile.

From this requirements profile, taking into consideration efficiency criteria 6, operational parameters, with which this requirements profile can be implemented (in the best way possible), can now be determined in a step S2. These operational parameters can also include an operational parameter that controls an activation and a deactivation of the respective radar sensor $2a$-$2h$. Efficiency criteria 6 relate in particular to the energy consumption, to the limitation of the data traffic on the bus systems of the motor vehicle 1 as well as to a utilization of the computing resources as low as possible. If, for example, a turning-right process is taking place, basically no or only a few data of the radar sensors $2e$, $2f$, and $2g$ oriented toward the left are required so that they can, for example, be deactivated, which saves energy and data traffic as well as computing resources. The sensors $2h$ and $2d$, which are oriented toward the front and toward the rear respectively, deliver data that could be relevant but are not as relevant as the sensor data delivered by the sensors $2a$ and $2b$, for example, so that the detection areas of the sensors $2a$ and $2b$ can ideally be adjusted such that they reflect the most important surrounding area and that a particularly high data acquisition rate with high precision is given, while the sensors $2h$ and $2d$ can be operated at below-average data acquisition rates and rather lower quality requirements, while the sensor $2c$ can continue to be operated with average operational parameters.

If the requirements profile shows in another example that precise data of the potential collision object 5 (cf. FIG. 2) are required, the detection areas of the sensors 3a, 3b, and 3h (FIG. 2 shows the maximum detection areas possible) can be adjusted such that all three radar sensors 3a, 3b, and 3h detect the object 5 so that a redundant detection is given and more accurate information about the object 5 can be obtained. The case that no critical driving situation is present and that objects are therefore only to be detected once as a result of the efficiency criteria 6 is however also conceivable. The current, actually used detection areas of the sensors 3a, 3b, and 3h can in such a case be adjusted such that only one of these radar sensors 3a, 3b, and 3h, such as the radar sensor 3a, actually measures the object 5.

As these specific examples show, a variety of driving situations can be mapped to appropriate requirements profiles, from which in turn an optimally suitable set of operational parameters results for the radar sensors 2a-2h, which satisfy this requirements profile as efficiently as possible by, for example, turning off/activating some sensors, operating them with higher or lower resource requirements, and the like.

Finally, the radar sensors 2a-2h are controlled in a step S3 according to the operational parameters determined in step S2. As the dashed arrow 7 in FIG. 3 indicates, the method is naturally repeated cyclically so that the current driving situation is always mapped by appropriate operational parameter sets, wherein the radar systems constituted by the radar sensors 2a-2h are respectively taken into consideration as a whole in order to satisfy requirements profiles optimally.

FIG. 4 shows a particularly advantageously usable radar sensor 2 in more detail. This radar sensor comprises a circuit board 8, on which a package 9 is arranged that consists of the antenna arrangement 10 of the radar sensor 2 and a semiconductor chip 11, in this case a CMOS chip. The CMOS chip 11 implements a radar transceiver 12, a control unit 13, and a digital signal processing component 14 (DSP). The radar sensor 2 can be implemented in an extremely compact design and can thus be installed in doors and bumpers of the motor vehicle 1 in a manner saving installation space. In addition, a certain intelligence is already given on the part of the radar sensor by the components implemented by means of the semiconductor chip 11.

This is utilized in a second embodiment of a motor vehicle 1' according to the invention as can be seen in FIG. 5. In this case, the central control device 4 is not shown even though it can also be provided, and the sensors 2a-2h are connected to one another in a ring-like connection structure. However, each of the sensors 2a-2h now comprises a computing unit 15, which is designed to perform the method according to the invention and which in the present case is constituted by the control unit 13 and/or the digital signal processing component 14. One of the sensors 2a-2h is now determined to be the master, in particular in dependence of the driving situation, and its computing unit 15 performs the method according to the invention until another sensor 2a-2h is determined to be the master. The other sensors 2a-2h, which are not the master, ultimately function as slaves. In this way, the distributed intelligence, which is provided in the radar sensors 2a-2h, can be used particularly advantageously.

I claim:

1. A method, comprising:
    operating radar sensors in a motor vehicle, wherein the radar sensors detect surroundings of the motor vehicle in a 360° angle range using their detection properties, the radar sensors having operational parameters, wherein at least one of the operational parameters of the radar sensors can be changed;
    analyzing, by a computing unit, driving situation data describing a current driving situation of the motor vehicle, wherein the current driving situation includes a turning motion situation;
    determining a requirements profile for the radar sensors based on the driving situation data wherein the operational parameters of the radar sensors are adapted to the requirements profile based on the detection properties of at least one of the radar sensors;
    controlling, by the computing unit, the radar sensors based on the adapted operational parameters; and
    deactivating, by the computing unit, a radar sensor of the radar sensors based on the turning motion situation.

2. The method according to claim 1, wherein the controlling further comprises:
    activating one of the radar sensors through triggering by at least one of the operational parameters or a data acquisition rate or at least one operational parameter describing a detection area or at least one operational parameter describing a distance separation capability or at least one operational parameter describing a preliminary evaluation to be carried out by the radar sensors.

3. The method according to claim 1, wherein the controlling further comprises:
    operating the radar sensors to detect an interesting surrounding area or the radar sensors detecting the interesting surrounding area with more frequent or more precise sensor data than other radar sensors delivering operational parameters for the interesting surrounding area described by the requirements profile.

4. The method according to claim 1, wherein the controlling further comprises:
    operating at least two of the radar sensors for a redundant detection of at least a part of a critical surrounding area, wherein the critical surrounding area is a subarea of the interesting surrounding area, the critical surrounding area being described by the requirements profile.

5. The method according to claim 1, wherein the determining further comprises:
    determining at least one efficiency criterion that minimizes energy consumption or an amount of data to be transported or required computing resources in an adjustment of the operational parameters of the radar sensors.

6. The method according to claim 5, wherein the controlling further comprises:
    turning off one of the radar sensors or a detection area of the one of the radar sensors to minimize redundancy for a non-critical portion of an interesting surrounding area, which is included in the requirements profile, of redundantly detecting radar sensors.

7. The method according to claim 1,
    wherein the radar sensors include eight radar sensors, and the eight radar sensors are respectively arranged in corner areas of the motor vehicle and between the corner areas of the motor vehicle.

8. The method according to claim 1, wherein the controlling further comprises:
    dynamically selecting a computing unit from a plurality of computing units associated with the radar sensors based on dependence of the driving situation data or the operational parameters.

9. The method according to claim 1,
    wherein ego data describing an operating state of the motor vehicle or at least a predictive operating state of the motor vehicle or environmental data describing the surroundings of the motor vehicle or requirements data describing specific requirements of at least one vehicle system are used as driving situation data.

10. A motor vehicle with radar sensors, which detect surroundings of the motor vehicle in a 360° angle range using their detection areas, wherein at least one computing unit of a radar sensor or a control device of the motor vehicle is designed to:

operate the radar sensors in the motor vehicle, wherein the radar sensors detect the surroundings of the motor vehicle in a 360° angle range using their detection areas and at least one operational parameter of the radar sensors can be changed;

analyze, by a computing unit, driving situation data describing a current driving situation of the motor vehicle wherein the current driving situation includes a turning motion situation;

determine a requirements profile for sensor data of the radar sensors based on the driving situation data wherein the operational parameters of the radar sensors are adapted to the requirements profile taking into consideration detection properties of at least one radar sensor;

control, by the computing unit, the radar sensors; and deactivate, by the computing unit, a radar sensor of the radar sensors based on the turning motion situation.

11. The motor vehicle according to claim 10, wherein at least one of the radar sensors comprises a semiconductor chip implementing a radar transceiver.

12. The motor vehicle according to claim 11, wherein a digital signal processing component or a control unit of the at least one of the radar sensors are implemented by the semiconductor chip, or the semiconductor chip and an antenna arrangement of the at least one of the radar sensors are implemented as a package.

* * * * *